United States Patent
de la Tocnay et al.

[19]

[11] Patent Number: 6,078,708
[45] Date of Patent: Jun. 20, 2000

[54] CONNECTION DEVICE FOR MULTIPLE-CORE OPTICAL FIBRES BASED ON OPTICAL ELEMENTS IN FREE SPACE

[75] Inventors: Jean-Louis de Bougrenet de la Tocnay, Saint Renan; Raymond Chevallier; Kevin Heggarty, both of Locmaria-Plouzané; Yves Defosse, Plouzané, all of France

[73] Assignee: France Telecom, Paris, France

[21] Appl. No.: 08/944,081

[22] Filed: Oct. 4, 1997

[30] Foreign Application Priority Data

Oct. 8, 1996 [FR] France ................................ 96 12240

[51] Int. Cl.⁷ ..................................................... G02B 6/32
[52] U.S. Cl. .................................................. 385/33; 385/31
[58] Field of Search .................................. 385/15, 31, 33, 385/36, 37, 39, 50, 73, 74, 126; 359/15, 19, 20, 34

[56] References Cited

U.S. PATENT DOCUMENTS

| | | | |
|---|---|---|---|
| 4,653,852 | 3/1987 | Suzuki et al. | 350/96.33 |
| 4,828,349 | 5/1989 | Nakasuji | 350/96.33 |
| 5,241,612 | 8/1993 | Iwama | 385/74 |
| 5,519,801 | 5/1996 | Le Noane et al. | |
| 5,617,227 | 4/1997 | De Bougrenet De La Tocnaye et al. | |

FOREIGN PATENT DOCUMENTS

94/19712  9/1994  WIPO.

OTHER PUBLICATIONS

Applied Optics, vol. 33, No. 14, May 10, 1994, pp. 2795–2803, XP000442243, O Brien D. C. et al., "Dynamic Holographic Interconnects That Use Ferroelectric Liquid--Crystal Spatial Light Modulators".

Optics Communications, vol. 109, No. 3/04, Jul. 1, 1994, pp. 328–337, XP000448151, Jahns J. et al., "Parallel Optical Interconnections Using Surface–Emitting Microlasers and a Hybrid Imaging System".

Optical Fibre Cables and Applications EFOC & N., Geneva, 1994, G. Le Noane et al., "Bunched Multiple–Core Monomode Fibres (BMMF): A New Key For The Future FTTH Networks".

French Patent Application No. 9301674 dated Feb. 15, 1993, Published under No. FR–A–2701571, G. Le Noane et al. (With attached English translation, titled "Small, High Preceision, Multicore Optical Guides and Process For The Production of Said Guides."

IEEE Micro, vol. 14, No. 6, pp. 10–19, Dec. 1994, M. B. Taghizadeh et al., "Developing Diffractive Optics for Optical Computing".

Applied Optics, vol. 28, No. 4, pp. 682,686,1989, Masayuki Kato et al., "Wavelength Independent Grating Lens System".

Optics Communications, vol. 84, No. 5, 6, pp. 383–392, (1991), J. Turunen et al., "Storage of Multiple Images in a Thin Synthetic Fourier Hologram".

Optical Engineering, vol. 33, Nov. 1994, M. T. Gale et al., "Fabrication of Continuous–Relief Micro–Optical Elements by Direct Laser Writing in Photoresists".

(List continued on next page.)

*Primary Examiner*—John D. Lee
*Assistant Examiner*—Michelle R. Connelly-Cushua
*Attorney, Agent, or Firm*—Pearne & Gordon LLP

[57] ABSTRACT

Connection device for multiple-core optical fibers based on optical elements in free space. This device comprises a first optical means (36) which is refractive or diffractive, and at least one second means (38, 40) which is diffractive. The first means causes the light beams exiting cores (30) of fiber (28) to diverge as far as an area in which these beams are separated in space and have cross sections whose size is compatible with the spatial bandpass of the second means. The latter is positioned in this area and directs the beams, independently from one another, towards corresponding optical components (34). Application to optic telecommunications.

11 Claims, 5 Drawing Sheets

OTHER PUBLICATIONS

Proc. Optical Computing, Heriot Watt University, Edinburgh Aug. 1994, Section II "Optical Interconnects and Switching Networks", pp. vii–ix (table of contents).

Report on Progress in Physics, vol. 54, No. 12, Dec. 1991, F. Wyrowski et al., "Digital Holography as Part of Diffractive Optics", pp. 1482–1484 (table of contents and abstract).

European Optical Society meetings on Microlens Arrays, National Physics Laboratory, Teddington, London, May 1993, coversheet and pp. 1–2 (table contents).

CONNECTION DEVICE FOR MULTIPLE-CORE OPTICAL FIBRES BASED ON OPTICAL ELEMENTS IN FREE SPACE

TECHNICAL FIELD

The present invention relates to a connection device for multiple-core optical fibres.

It particularly applies to optic telecommunications.

STATE OF PRIOR ART

A multiple-core optical fibre may have the outer diameter of a standard monomode optical fibre with a single core (125 µm), but it contains multiple cores, typically from 4 to 10 cores.

Preferably the diameter of the cores is substantially equivalent to that of the core of a monomode fibre (8 µm) and these cores are distanced by approximately 40 µm.

On the subject of multiple-core optical fibres reference may be made to documents (1) to (4) which, like the other documents quoted herein, are given at the end of the present disclosure.

Figure 1:
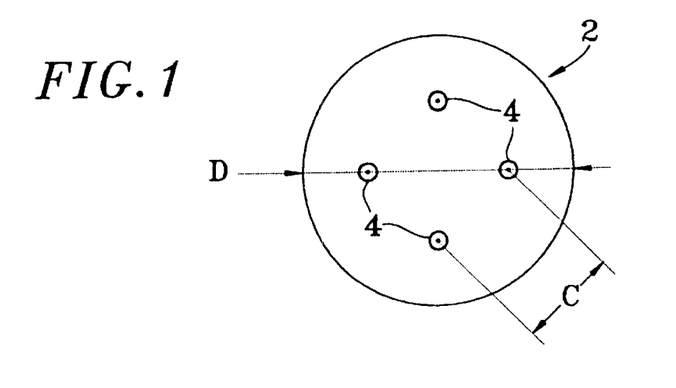
FIG. 1, already described is a cross section view illustrating an example of a multiple-core optical fibre, FIG. 2, already described, is a cross section view illustrating a bar link for monomode optical fibres.

An example of a multiple-core optical fibre 2 is illustrated in a cross-section diagram in FIG. 1 of the appended drawings.

In this example, multiple-core fibre 2, whose outer diameter D is 125 µm, contains four cores carrying reference 4, which are positioned at the top corners of a square whose side C measures 44.2 µm.

The optical cladding areas surrounding these cores are not shown in FIG. 1.

With multiple-core optical fibres it is possible to substantially increase fibre flow and to reduce weight, volume and therefore the overall cost of manufacture and installation by monomode optical waveguide (compared with known monomode fibres with a single core).

However, introducing these multiple-core fibres into telecommunications networks assumes their compatibility and more especially their possible connection to different end components.

These components may be simply optical or opto-electronical.

In addition, they may be active or passive.

These components may, for example, be bar links or matrices for optical fibres (single core), planar optical guides, matrix photodetectors, laser matrices or VCSELs, that is to say Vertical Cavity Surface Emitting Lasers.

Figure 2:
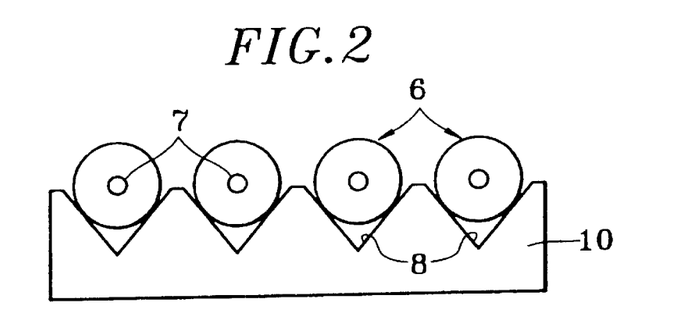

By way of illustration, FIG. 2 shows a diagram of a bar link 6 for optical fibres (with a single core 7) which are respectively positioned in V-shaped grooves 8 cut in a suitable support 10.

It is true that connection devices are known for connecting multiple-core optical fibres to end components, but these are devices using optical waveguides.

They have the disadvantage of not being adaptable to connections of any geometry and with high fan outs.

DISCLOSURE OF THE INVENTION

The present invention solves the problem of connecting a multiple-core optical fibre to an optical or opto-electronical component while nevertheless permitting any type of reconfiguration and with high fan outs.

For this purpose the present invention uses a connection in free space.

More precisely, the present invention relates to a connection device intended to connect a multiple-core optical fibre to an end optical component or vice versa, the fibre comprising N cores, N being a whole number of at least 2, the end optical component comprising P elementary optical components, P being a whole number of at least 2, in such manner that optical links between the N cores and the P elementary components may be made, said device being characterized in that it comprises:

a first optical means which is refractive or diffractive, and at least one second optical means which is diffractive, the first optical means being able to cause light beams exiting the N cores to diverge as far as an area where these beams are separated in space and have cross sections whose sizes are compatible with the spatial bandpass of the second optical means, this second optical means being positioned in this area and being able to direct the light beams, independently one from the other, towards the corresponding elementary components.

By "(elementary) optical component" is meant an (elementary) component that is either simply optical or opto-electronic.

The first optical means may be a lens.

According to a first particular embodiment of the device of the invention, N is equal to P and the second optical means is able to send the light exiting each core towards a single elementary component.

According to a second particular embodiment, the second optical means is able to send the light exiting at least one of the N cores towards a plurality of the P elementary components.

According to a third particular embodiment, the second optical means is able to send the light exiting at least two of the N cores towards a single elementary component.

The device that is the subject of the invention may also comprise at least a third optical means which is refractive or diffractive and able to achieve a mode adaptation for the end optical component.

The first, second and third optical means may be:

- respectively formed on substrates that are independent from one another and transparent to the light beams,
- or grouped in pairs, the optical means of one same group being respectively formed on two opposite surfaces of one same substrate that is transparent to the light beams,
- or formed on one same substrate that is transparent to the light beams, some of the first, second and third optical means operating by reflection in such manner that an optical link can be made between the first, second and third optical means.

Those first, second and third optical means which are refractive may be chosen from the group comprising microlenses and micro-prisms.

Those first, second and third optical means which are diffractive may be chosen from the group comprising optical analogous holograms recorded in a photosensitive material and computer-generated optical holograms.

BRIEF DESCRIPTION OF THE DRAWINGS

The present invention will be more easily understood on reading the description of examples of embodiment below, given for illustrative purposes and in no way restrictive, with reference to the appended drawings in which.

DETAILED DESCRIPTION OF PARTICULAR EMBODIMENTS

Figure 3:
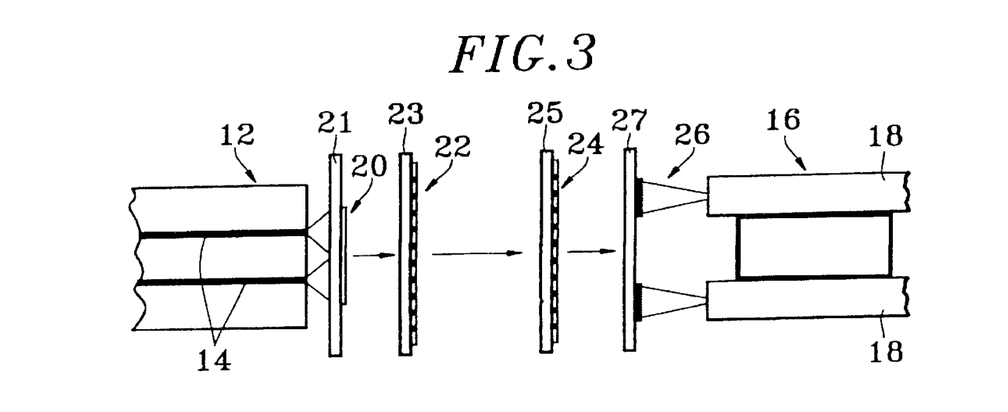
FIG. 3 is a diagram illustrating the principle of the present invention.

FIG. 3 is a cross section view illustrating a device of the invention.

This device is intended to connect a multiple-core optical fibre 12 comprising several cores 14, of which two are shown in FIG. 3, to an end optical component 16 comprising several elementary optical components 18, of which two are shown in FIG. 3.

With this device it is possible to optically connect cores 14 of fibre 12 respectively to elementary components 18, each core being connected optically to an elementary component.

In accordance with the present invention, the device of FIG. 3 uses connections in free space.

In this respect reference may be made to document (5).

These connections are made by means of a multiplicity of groups of diffractive and/or refractive micro-optical elements 20, 22, 24 and 26.

At least one of these groups is made up of diffractive micro-optical elements and is given reference 22 in FIG. 3.

The choice of connections in free space arises from the two-dimensional configuration of the end part of multiple-core fibre 12 and from the need to connect this fibre to a component having a different configuration (for example a bar link for optical fibres which each have a single core), this component leading to a connection solution which uses the three dimensions in space.

The use of at least one group 22 of diffractive micro-optical elements arises from the need to achieve complex, varied interconnection functions possibly with a high fan out.

The diffractive elements allow such functions to be achieved at low cost and with minimum volume requirement.

On this matter reference should be made to document (6).

The use of a multiplicity of groups of micro-optical elements arises from the twofold need for configuration conversion and mode adaptation for multiple-core optical fibre 12 and possibly for end component 16.

More precisely, the first group of micro-optical elements 20 allows the light beams exiting the cores of fibre 12 to be diverged as far as an area where these beams are separated in space and in which the cross section size of these beams is compatible with the total sum space x band (spatial bandpass) of group 22 of diffractive micro-optical elements.

This group 22 of diffractive micro-optical elements 22 is positioned in this area and is intended to direct the light beams exiting cores 14 of fibre 12, in independent manner, towards elementary components 18.

Group 24 of the device in FIG. 3 is intended to rectify arriving light beams to place them in the axis of elementary components 18.

If mode adaptation is required for end component 16 (for example if the latter is a planar optical waveguide), it is necessary to use, in addition to groups 20 and 22, at least one additional group of micro-optical elements to make this adaptation.

In the case illustrated in FIG. 3, there are two such additional groups 24 and 26.

For example, it may be required to inject the light exiting the cores of fibre 12 into a bar link or a matrix of standard monomode optical fibres (with a single core) in which, in order to obtain correct coupling rates, the light must be injected into the fibres in accordance with the fibre axes and with the correct digital opening.

As a general rule, a device of the invention comprises at least two groups of micro-optical elements and at least three such groups if, in addition to mode adaptation for a multiple-core optical fibre, mode adaptation is also required for the end component.

In certain cases, for example when conversion of configuration or mode adaptation is particularly complicated, it may be decided to use a greater number of groups of micro-optical elements in order, in particular, to reduce constraints regarding the technological manufacture of these groups.

It is to be noted, that the use of additional groups of micro-optical elements give the device of the invention greater flexibility of use due to:

the possibility of choosing those micro-optical elements which are best suited to intended function (for example refractive elements for focalizing), the possibility of correcting aberrations by using the coupling of two elements (as for an achromatic lens for example), and the possibility of achromatizing the device for determined wavelengths (for example 1.55 $\mu$m and 1.3 $\mu$m for optic telecommunications) or for determined wavelength bands (for example a band of 40 nm for optic telecommunications).

On this latter possibility reference may be made to documents (7) and (8).

For the production of the diffractive micro-optical elements required by the present invention, several techniques are possible.

Such diffractive elements may, for example, be written as standard optical analogous holograms on photosensitive material such as, for example, bichromate gelatine.

Taking into consideration, however, the needs of complex interconnection functions, it is preferable to use computer synthesized holograms.

In respect of calculation and production techniques for said synthesized diffractive elements, reference may be made to documents (6) and (9).

Similarly, in order to reduce losses attributable to the device, diffractive elements with high diffractive efficiency are preferably used, which implies the use of elements with several phase levels which are for example engraved in glass, or elements with a continuous profile.

On this subject reference should be made to document (11).

For refractive micro-optical elements, several production techniques are also possible.

Document (10) is the reference for these elements.

It is for example possible to use a fusion of photoresist, a protonic irradiation of polymethylmetacrylate, silica engraving or ion exchange.

It is to be noted that various techniques are known for low cost duplication of diffractive micro-optical elements and refractive micro-optical elements.

Moulding and stamping techniques for example may be used.

Document (11) may be referred to on their subject.

The use of these techniques brings a substantial reduction in mass production costs of devices of the invention and therefore increases their competitivity.

Figure 4:
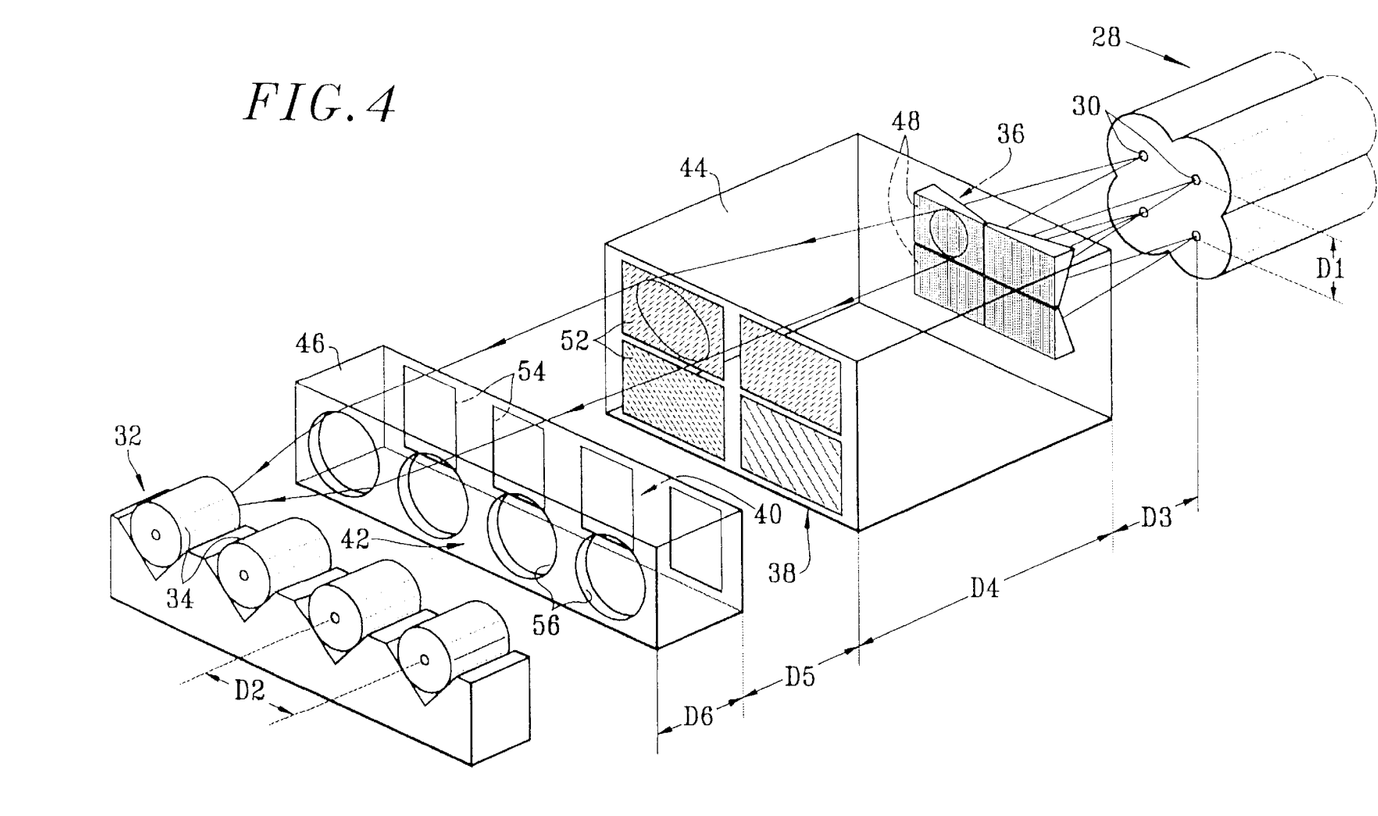
FIG. 4 is an illustrative diagram of a particular embodiment of the device of the invention.

FIG. 4 shows an illustration of the present invention applied to the connection of a multiple-core optical fibre 28, with four cores 30, to a bar link 32 of four standard monomode optical fibres 34 which each have a single core.

The connection device in accordance with the present invention which is illustrated in FIG. 4, comprises four groups of micro-optical elements.

These groups are respectively referenced 36, 38, 40 and 42, as viewed from fibre 28 as far as bar link 32, and all operate by transmission.

In the example illustrated in FIG. 4, groups 36 and 38 are fabricated on two opposite, parallel, level surfaces of one same parallelepiped substrate 44 which is transparent to light exiting the cores of fibre 28.

In the same way, groups 40 and 42 are made on two opposite, parallel level surfaces of one same parallelepiped substrate 46 which is transparent to this light.

Simply for illustrative purposes which are in no way restrictive:

distance D1 between two adjacent cores of fibre 28 is 44.2 µm distance D2 between the axes of two adjacent monomode fibres of bar link 32 is 250 µm, distance D3 between the surface of substrate 44 which carries group 36 and the end of the fibre positioned facing said group 36 is approximately 200 µm distance D4 between the surfaces of substrate 44 carrying respectively groups 36 and 38 is in the region of 1 to 2 mm, distance D5 between the surfaces of substrates 44 and 46 which are positioned facing one another, which respectively carry groups 38 and 40, is in the region of 1 mm, and distance D6 between the surfaces of substrate 46, which respectively carry groups 40 and 42, is approximately in the region of 1 mm.

The first group 36 is a group of micro-prisms. 48.

There are four micro-prisms in the example illustrated and they respectively relate to the four cores of fibre 28.

These micro-prisms 48 are intended to achieve angular separation of the light beams respectively exiting cores 30 of fibre 28 in such manner as to allow them to diverge sufficiently in order to obtain a product space x band that is compatible with the use of diffractive micro-optical elements, without any overlapping of the light beams exiting the different cores.

Figure 5:
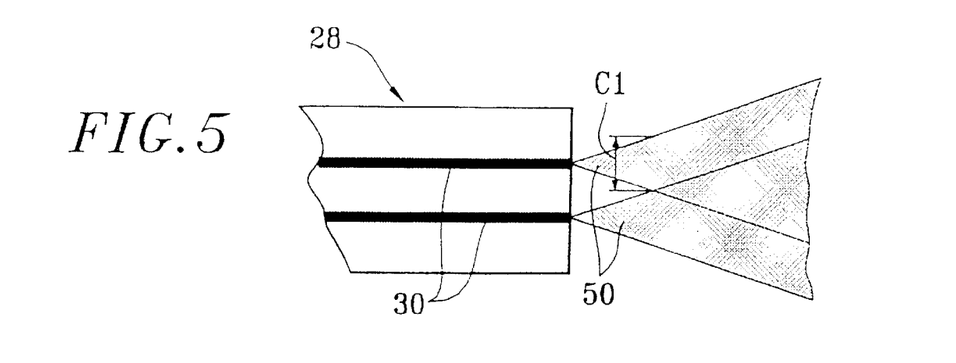
FIGS. 5 and 6 show the appearance of the light beams exiting the cores of the fibre using the device of FIG. 4 respectively without micro-prisms and with micro-prisms at the fibre exit, and FIGS. 7 to 10 give diagrams of variants of embodiment of the device of FIG. 4.
Figure 6:
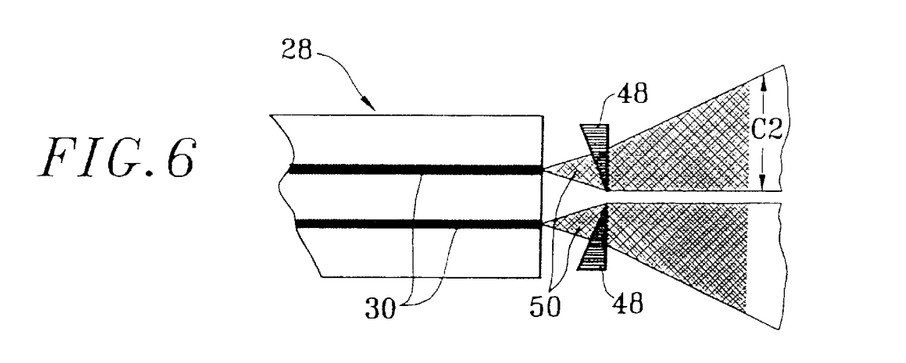

This is illustrated in FIGS. 5 and 6.

FIG. 5 is a cross-section view of fibre 28 which shows two of cores 30 and the two light beams 50 respectively exiting said cores 30 with no micro-prism positioned in sequence to fibre 28.

In this case said light beams 50 overlap, optical field C1 being in the region of 40 µm.

On the contrary, when micro-prisms 48 are used (FIG. 6) said micro-prisms allow beams 50 to be separated and at a defined distance from said micro-prisms 48 an optical field C2 is obtained of approximately 500 µm.

The use of group 36 of micro-prisms 48 allows use of the second group 38 made up of diffractive elements 52 and use of the third group 40 also made up of diffractive elements 54.

These groups each comprise as many diffractive elements as there are cores contained in fibre 28 (four in the example illustrated in FIG. 4).

Groups 38 and 40 are holograms made up of elementary holograms which respectively form elements 52 and 54.

Holograms 52 of group 38 are respectively matched with holograms 54 of group 40.

In this way hologram "doublets" are obtained.

These doublets are used for the angular correction of light beams, to adapt the convergence of the latter and to convert co-ordinates that is to say the conversion from a three-dimensional configuration (fibre 28) to a two-dimensional configuration (bar link 32).

The fact that these holograms have several functions justifies the use of diffractive elements in the present invention.

Moreover, the use of several groups of micro-optical elements facilitates achromatization of the device (see documents (7) and (8) as mentioned above.

The fourth group 42 of micro-optical elements is made up of micro-lenses 56 which are respectively matched with the above-mentioned doublets and are intended to optimize optical coupling in fibres 34.

Diffractive micro-lenses may be used or refractive micro-lenses.

The choice is related to criteria such as efficiency, technological compatibility and ease of miniaturisation.

Figure 7:
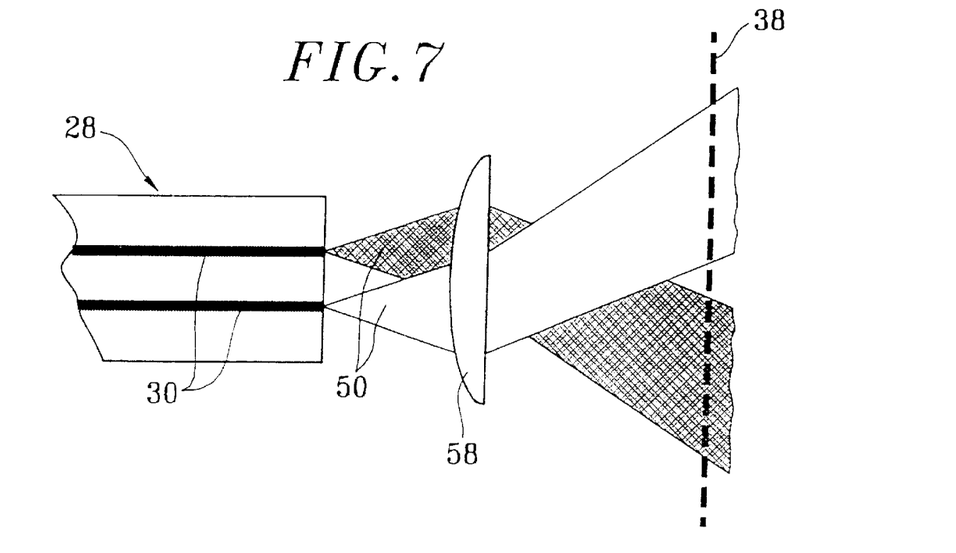

Instead of the first group 36 made up of micro-optical elements 48, a micro-lens 58 may be used as illustrated in FIG. 7.

This micro-lens 58 may be refractive or even diffractive.

Also, said micro-lens 58 may be convergent or divergent.

If a convergent lens is used (as in FIG. 7) light beams 50 exiting cores 30 of multiple-core fibre 28 cross over one another at the exit of said micro-lens 58 and re-separate ahead of group 38 of diffractive elements.

Also, instead of being used to achieve a connection function of type 1 towards 1, the device that is the subject of the invention may be used to achieve a distribution function of type 1 towards N.

Therefore, instead of sending the light that exits one core of the multiple-core fibre into a single area of the end component (for example one optical fibre among several optical fibres on a bar link with monomode optical fibres), which corresponds to a connection of type 1 to 1, the diffractive elements may be determined so that they distribute the light exiting one core of the multiple-core fibre into several areas of the end component and, for example, inject this light into several fibres on the bar link.

This may be made for all the cores of the multiple-core fibre or only for some of them.

Light distribution may be made in equal or unequal manner and the number of areas of the end component may be different from the number of cores of the multiple-core fibre.

The present invention may also be used to achieve a "fusion" function of type N towards 1.

For this purpose, instead of sending the light exiting one core of the multiple-core fibre into a single area of the end component, which forms a connection of type 1 towards 1, the diffractive elements may be designed so that they direct the light exiting several cores of the multiple-core fibre into the same area of the end component, for example into the same optical fibre on a bar link of monomode optical fibres.

This function may be made to concern all the cores of the multiple-core fibre and all the end component areas or only some of the latter.

For a given end component area, the contributions derived from different cores of the multiple-core fibre may be made in equal or unequal parts.

The number of areas of the end component may be different to the number of cores of the multiple-core fibre.

In the same manner, a device in accordance with the invention may, as for example that in FIG. 4, be used "in reverse" that is to say for connecting a bar link or a matrix of monomode (single core) optical fibres or planar optical waveguides or even light sources such as VCSELs to a multiple-core fibre.

The light exiting the fibres of the bar link (or the matrix or planar waveguides or VCSEL's for example) is subsequently injected into the cores of the multiple-core fibre.

The groups of diffractive elements and the groups of refractive elements may be fabricated respectively on independent substrates and mounted similar to a multiple element photographic lens.

This is illustrated in FIG. 3 in which the substrates matched with groups 20, 22, 24 and 26 are respectively referenced 21, 23, 25 and 27.

Figure 8:
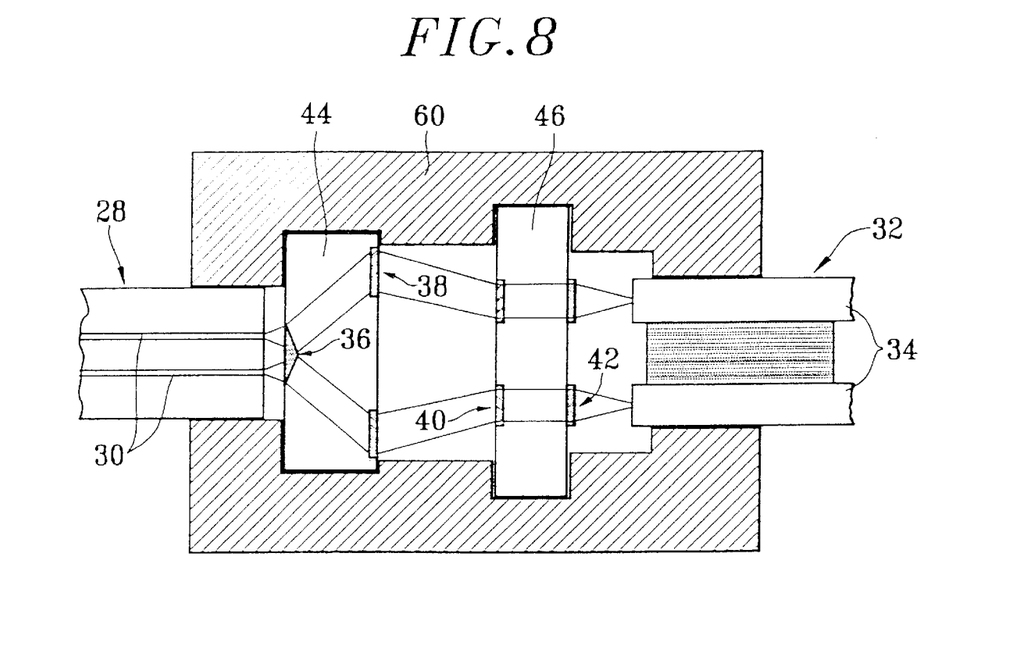

As a variant, these groups are made in pairs, the two groups of one same pair being fabricated on two opposite surfaces of one same transparent substrate as illustrated in FIG. 4 and FIG. 8.

FIG. 8 in fact reproduces the different components of FIG. 4.

These components are mounted on an appropriate support 60 which also holds the end of multiple-core fibre 28 and the end of end component 32, said ends being intended to be optically connected.

The groups of diffractive elements and the groups of refractive elements may also all be fabricated on one same substrate transparent to the light exiting the cores of the multiple-core optical fibre.

These groups may be made on one surface of this substrate or on the two surfaces of the substrate.

The light therefore makes one or more return journeys inside the substrate with the aid of the reflective treatments provided for this purpose and applied to said substrate.

Figure 9:
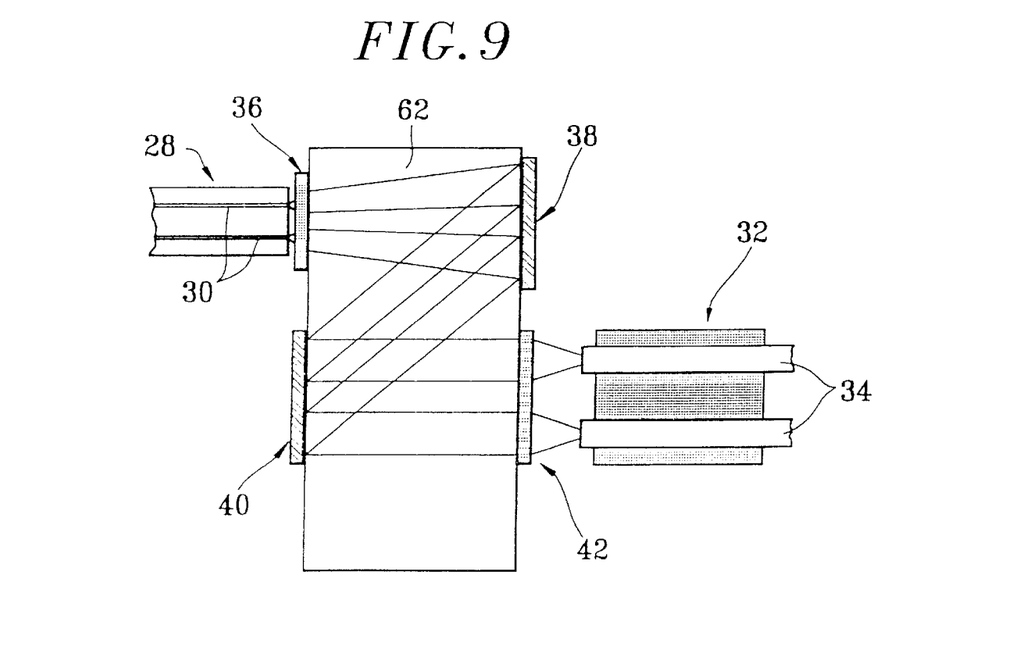

This is illustrated in the diagram of FIG. 9 which shows multiple-core optical fibre 28 and end component 32 which is intended to be optically linked to said fibre 28.

This Figure also shows a substrate 62 transparent to the light exiting cores 30 of multiple-core optical fibre 28.

For the device shown in FIG. 9, the same groups of micro-optical elements are used as in the case shown in FIG. 4 and these groups have the same references as those they have been given in said FIG. 4 but, in FIG. 9, groups 36 and 42 still operate by transmission whereas groups 38 and 40 operate by reflection.

Groups 36 and 40 are placed on a first surface of substrate 62, group 36 being positioned facing fibre 28.

Groups 38 and 42 are placed on a second surface of substrate 62, group 42 being positioned facing component 32.

The relative positions of groups 36, 38, 40 and 42 are such that the light beams exiting cores of fibre 28 cross through group 36 (and interact with the latter) then cross through substrate 62, are reflected on group 38 (and are diffracted by the latter), again cross through substrate 62, are reflected on group 40 (and are diffracted by the latter), again cross through substrate 62 and then cross through group 42 (interacting with the latter) and finally reach component 32.

The device of the invention, which is illustrated in the diagram of FIG. 9, is of particular interest as it allows "alignment" problems of the various component parts to be transferred to technological design and also brings a reduction in the number of interfaces and therefore a reduction in losses due to reflections.

Figure 10:
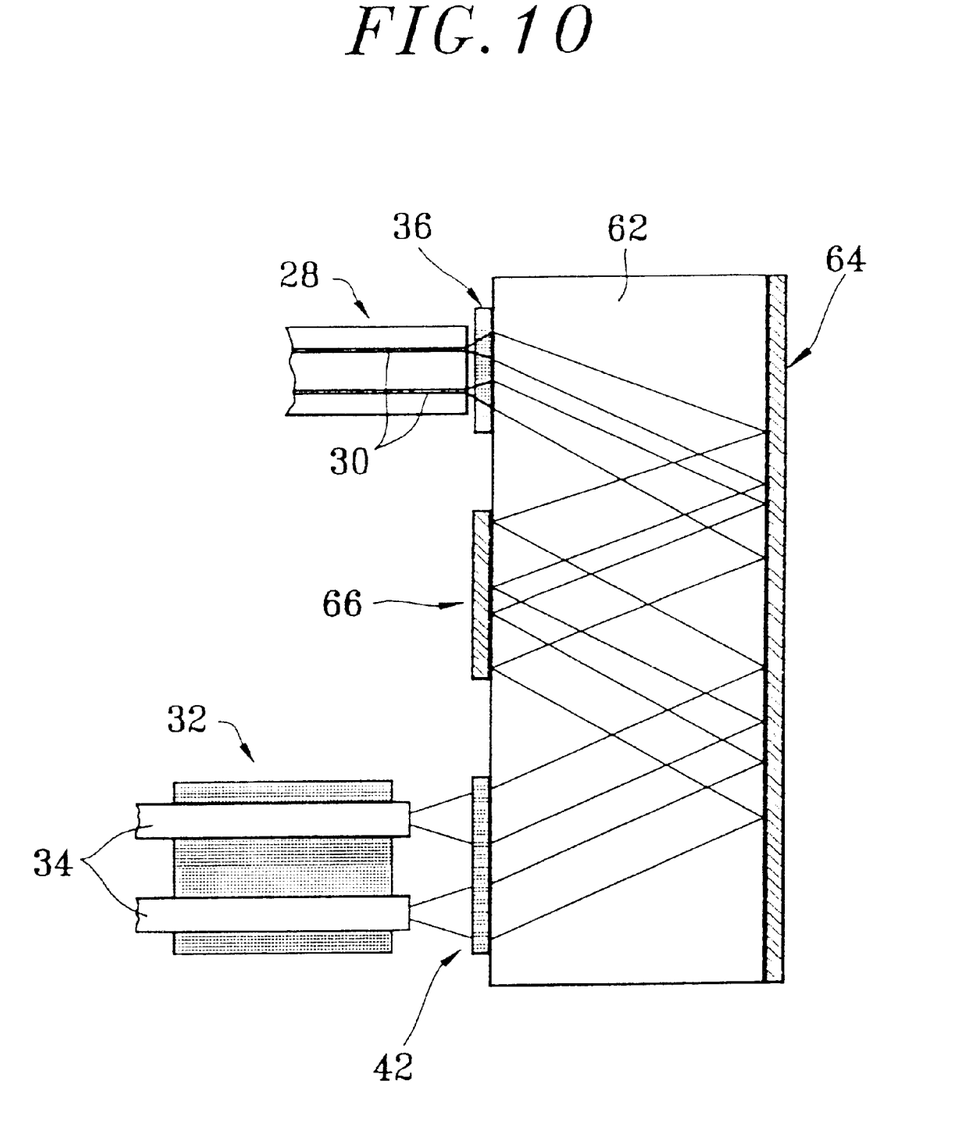

FIG. 10 illustrates a variant of embodiment of the device in FIG. 9.

In the case shown in FIG. 10, groups 36 and 42 operate by transmission and are made (engraved) on the first surface of substrate 62.

Fibre 28 is again placed facing group 36.

Component 32 is again placed facing group 42.

The second surface of substrate 62 is coated with a reflective layer 64.

Instead of groups 38 and 40 in FIG. 9, the device in FIG. 10 comprises a group 66 of diffractive micro-optical elements which operate by reflection.

Said group 66 is placed on the first surface of substrate 62, between groups 36 and 42.

The relative positions of groups 36, 66 and 42 are such that the light beams exiting the cores of fibre 28 cross through group 36 (and interact with the latter), then cross through substrate 62, are reflected on layer 64, again cross through substrate 62, are reflected on group 66 (and are diffracted by the latter), again cross through substrate 62, re-cross the latter after reflection on layer 64, and then cross through group 42 (interacting with the latter) and finally reach component 32.

If angle conditions for total internal reflection in substrate 62 are fulfilled, layer 64 is no longer necessary.

The manufacture of the device in FIG. 10 is simpler than that of the device in FIG. 9 as, in FIG. 10, it is not necessary to align micro-optics on both surfaces of substrate 62.

To simplify the installation of a device in accordance with the invention, it is possible to "align" and to factory mount all the component parts and to supply users with a sealed fibre-fitted device.

In this case, the installation of the device only requires a few weld points, splices or connections if the end fibres 34 are fitted with optical connectors.

It is to be noted that the different variants of embodiment of the invention mentioned above may be used separately or in combination.

The present invention covers all possible combinations of these variants.

The documents mentioned in this disclosure are as follows:

(1) G. Le Noane, C. Botton, P. Grosso, D. Boscher, I. Hardy, J. C. Bizeul and A. Le Meur, "Bunched multiple-core monomode fibres (BMMF): A new key for the future FTTH networks", Optical Fibre Cables and Applications EFOC & N, Geneva, 1994

(2) G. Le Noane, P. Grosso & I. Hardy, French patent application n° 9301674 dated Feb. 15, 1993, published under n° FR-A-2701571

(3) EP-A-0611973 corresponding to document (2)

(4) U.S. Pat. No. 5,519,801, also corresponding to document (2)

(5) Section II "Optical interconnects and switching networks", Proc. Optical Computing, Heriot Watt University, Edinburgh August 1994

(6) M. B. Taghizadeh, J. M. Miller, P. Blair and F. A. P. Tooley, "Developing Diffractive Optics for Optical Computing", IEEE micro, vol.14, n° 6, pp 10–19, December 1994

(7) Masayuki Kato et al., "Wavelength independent grating lens system", Applied Optics, vol. 28, n° 4, pp 682, 686 (1989)

(8) J. Turunen et al., "Storage of multiple images in a thin synthetic Fourier hologram", Optics Communications, vol. 84, n° 5, 6, pp 383 to 392 (1991)

(9) F. Wyrowski and O. Brybqdahl, "Digital holography as part of diffractive optics", Report on progress in physics, vol. 54, N° 12, December 1991

(10) Actes du congrès EOS meetings on Microlens Arrays, National Physics Laboratory, Teddington, London, May 1993

(11) M. T. Gale, M. Rossi, J. Pedersen and H. Schutz, "Fabrication of continuous-relief micro-optical elements by direct laser writing in photoresists", Optical Engineering, vol. 33, November 1994.

What is claimed is:

1. Connection device intended to connect a multiple-core optical fibre (12, 28) to an end optical component (16, 32) or vice versa, the fibre comprising N cores (14, 30), N being a whole number of at least 2, the end optical component (16, 32) comprising P elementary optical components (18, 34), P being a whole number of at least 2, in such manner as to set up optical links between the N cores and the P elementary components, said device being characterized in that it comprises:

a first optical means (20, 36, 58) which is refractive or diffractive, and at least one second optical means (22, 38–40, 66) which is diffractive, the first optical means being able to cause light beams exiting the N cores to diverge as far as an area in which these beams are separated in space and in which their cross-section sizes are compatible with the spatial bandpass of the second optical means, said second optical means being positioned in this area and being able to direct the light beams, independently from one another, towards the corresponding elementary components.

2. Device in accordance with claim 1, characterized in that the first optical means is a lens (58).

3. Device in accordance with claim 1, characterized in that N is equal to P and in that the second optical means (22, 38–40, 66) is able to send the light exiting each core (14, 28) towards a single elementary component (18, 34).

4. Device in accordance with claim 1, characterized in that the second optical means is able to send the light exiting at least one of the N cores towards a plurality of the P elementary components.

5. Device in accordance with claim 1, characterized in that the second optical means is able to send the light exiting at least two of the N cores towards a single elementary component.

6. Device in accordance with claim 1, characterized in that in addition it comprises at least a third optical means (24–26, 42) which is refractive or diffractive and able to carry out a mode adaptation for the end optical component (16, 32).

7. Device in accordance with claim 6, characterized in that the first, second and third optical means are respectively formed on substrates (21-23-25-27) independent from one another and transparent to the light beams.

8. Device in accordance with claim 6, characterized in that the first, second and third optical means are grouped in pairs, the optical means of one same group being respectively formed on two opposite surfaces of one same substrate (44–46) transparent to the light beams.

9. Device in accordance with claim 6, characterized in that the first, second and third optical means are formed on one same substrate (62) transparent to the light beams, some of the first, second and third optical means operating by reflection in such manner as to allow an optical link to be made between these first, second and third optical means.

10. Device in accordance with claim 6, characterized in that those first, second and third optical means which are refractive are chosen from the group comprising micro-lenses and micro-prisms.

11. Device in accordance with claim 6, characterized in that those first, second and third optical means which are diffractive are chosen from the group comprising optical analogous holograms recorded in a photosensitive material and optical holograms generated by computer.

* * * * *